United States Patent [19]
Angell

[11] Patent Number: 5,769,462
[45] Date of Patent: Jun. 23, 1998

[54] RELEASABLE COUPLING

[76] Inventor: Jonathan George Cordy Angell, 2 Vicarage Cottages, Iford, Lewes, East Sussex BN7 3EJ, England

[21] Appl. No.: 583,069

[22] PCT Filed: Jul. 7, 1994

[86] PCT No.: PCT/GB94/01471

§ 371 Date: Mar. 4, 1996

§ 102(e) Date: Mar. 4, 1996

[87] PCT Pub. No.: WO95/02148

PCT Pub. Date: Jan. 19, 1995

[30] Foreign Application Priority Data

Jul. 8, 1993 [GB] United Kingdom .................. 9314094

[51] Int. Cl.⁶ ................................................... F16L 55/00
[52] U.S. Cl. ........................... 285/39; 285/308; 285/323; 285/912
[58] Field of Search ............................. 285/39, 308, 322, 285/323, 113, 421, 912

[56] References Cited

U.S. PATENT DOCUMENTS

| | | | |
|---|---|---|---|
| 1,930,194 | 10/1933 | Dillon | 285/104 |
| 2,108,040 | 2/1938 | Bluehdorn et al. | 285/308 X |
| 5,328,215 | 7/1994 | Grenier | 285/323 X |

FOREIGN PATENT DOCUMENTS

| | | |
|---|---|---|
| 57789 | 2/1990 | Japan ..................................... 285/322 |
| 1494553 | 12/1977 | United Kingdom . |
| 1520742 | 8/1978 | United Kingdom . |
| 1599285 | 9/1981 | United Kingdom . |
| 2132296 | 7/1984 | United Kingdom . |
| 2161566 | 1/1986 | United Kingdom . |
| 2165604 | 4/1988 | United Kingdom . |
| 2256246 | 2/1992 | United Kingdom . |

*Primary Examiner*—Terry Lee Melius
*Assistant Examiner*—Heather Shackelford
*Attorney, Agent, or Firm*—Alix, Yale & Ristas, LLP

[57] ABSTRACT

A coupling for releasably engaging a tubular member has a hollow body, in which the tubular member is received, and a sleeve which is movable axially within the hollow body. The sleeve is provided with an array of spacially separated holes and rotatable gripping members are located in these holes for selectively engaging the outer surface of the tubular member. During insertion of the tubular member into the hollow body, the rotatable gripping members move away from the outer surface of the tubular member. Movement of the tubular member in the opposite direction causes the rotatable gripping members to be cammed into contact with the surface of the tubular member.

24 Claims, 2 Drawing Sheets

RELEASABLE COUPLING

BACKGROUND OF THE INVENTION

1. Field of the Invention

The present invention relates to couplings in which a hollow body is adapted to grip and retain an object inserted into it, with the gripping effect being releasable such that the object may be removed from the body.

In particular, the invention relates to devices in which the attempted removal of the object from the body without operating a release mechanism causes a gripping device to engage and grip the object more tightly, so that removal of the object is prevented.

2. Description of the Prior Art

An example of such a releasable coupling has a resilient washer having a plurality of resilient fingers located near the entrance to the body. The resilient fingers extend into the hollow body in a direction away from the entrance and are oriented at an acute angle to the body's internal surface, so that a tube may be inserted by pushing it past the fingers, but removal of the tube is prevented by the gripping effect of the fingers as they are forced to bend outwards. The tube may be removed by pressing a ring, for example, which acts on the washer to bend the fingers away from the tube surface, thus releasing their grip on the tube and allowing its removal.

Such prior art devices using a washer with internally facing resilient fingers have been found to have a number of problems. Firstly, they rely on the resilience of the fingers to provide sufficient initial grip on the inserted tube so that the withdrawal of the tube is prevented by the effect of pulling the tube from the socket tending to bend the fingers towards the tube. Repeated use of the device will tend to reduce the resilience of the fingers, therefore weakening the gripping effect on the tube and thus degrading the coupling's operation. If the angle of the fingers to the axis of the tube when gripping it becomes too close to the perpendicular, it may be possible to remove the tube by applying sufficient force since the fingers can more easily be bent in this position. Once this has occurred, the device may be permanently damaged. There is also a risk that because the tube must be forced past the resilient fingers as it is inserted, it or the fingers may become damaged. This can be particularly important if a good seal between the tube surface and coupling is required. Finally, since it is necessary to bend the fingers away from the tube surface in order to release the tube, there is also a requirement that the inserted tube must be able to be moved at least a very small distance further into the socket in order to lessen the gripping of the tube by the fingers so that this can be achieved. Thus if the tube has been inserted into the body as far as possible, there may not be sufficient axial play for the tube to be releasable.

Another prior art device, which does not use a washer having resilient fingers, thus overcoming some of the problems mentioned above, is described in GB-1520742. This document discloses a tube coupling having a cylindrical hollow body in which a collet may be inserted from the end in which the tube is to be inserted. The collet has inwardly tapering resilient arms which extend into the body away from the opening through which the tube is inserted. The collet is free to move axially within the body, and a cam surface is provided on the body near the entrance and is arranged such that attempted removal of the collet past this surface forces the resilient arms inwards towards the centre of the body. Thus, when a tube is inserted, this forces the resilient arms of the collet apart, but attempted removal of the tube brings the arms into contact with the cam surface, causing them to grip the tube more tightly. The arms grip the tube due to their resilience and are thus carried with it. By pushing the end of the collet which protrudes from the entrance of the body towards the body, the resilient arms are prevented from coming into contact with the cam surface, and are free to spread slightly, and thus the tube can be removed.

An improved version of the GB-1520742 device is described in GB-B-2165604. This improved device still uses resilient arms to grip the tube, but metal teeth are provided on the inside surfaces of the arms to improve this grip. Two O-rings are also used to seal the tube in the coupling more efficiently.

Although these devices using a collet having inwardly tapering resilient arms to grip the tube avoid some of the problems associated with washers, they still rely initially on the resilience of a member to grip the tube, so repeated use can degrade their performance. Again, damage can occur to the tube or collet as the tube is inserted past the resilient arms. If the collet is intended to be removable from the socket, such that it is replaceable for example, then the removal of the collet past the cam surface forces the arms to flex a relatively large distance inwardly, thus again subjecting them to relatively large deformations.

SUMMARY OF THE INVENTION

According to one aspect of the present invention, there is provided a releasable coupling for retaining an object inserted through an opening in one end of a hollow body, comprising: retaining means for engaging and gripping said object, said retaining means being arranged such that said object may be inserted into said body past said retaining means substantially without resilient deformation of the retaining means, and such that removal of said object is substantially prevented by the gripping action of said retaining means; and release means for releasing the gripping action of said retaining means to permit withdrawal of said object from said body.

In the present invention, since the object may be inserted without resilient deformation of the retaining means, the build-up of damage due to repeated deformation, and the degradation in performance of the retaining means does not occur.

Preferably, the retaining means is arranged such that the object may be inserted substantially without resistance. In that case, there is substantially no deformation of either the object being inserted, the retaining means, or the hollow body. Thus there is no risk of damage being caused by any forces acting as the object is inserted, nor of repeated insertions causing a build-up of such damage.

The coupling device of the present invention is suitable for use in basic plugs and sockets, such as electrical plugs and sockets. It is also useful for coupling pipes, in which case the hollow body would have a throughbore. Both metal and plastic pipes can be coupled, and even soft walled tubes can be used provided a more rigid central support core is inserted within the tube prior to insertion in the coupling. This core could be, for example, separable from the coupling, or a captive spigot therewith.

The retaining means is preferably arranged such that attempted removal of the object through the opening causes the retaining means to grip the object more tightly.

In a preferred embodiment, the retaining means is free to move substantially without resistance at least a small distance in a direction substantially perpendicular to the longitudinal axis of the body, but is adapted such that the contact in use between the outer surface of the object and the retaining means generates sufficient frictional force for movement of the object towards the opening in the body to entrain the retaining means.

The freedom of the retaining means to move in a direction perpendicular to the longitudinal axis of the body means that substantially no resistance is provided to the object's insertion, since the retaining means may freely move apart to accommodate it. Furthermore, since the retaining means is correspondingly free to move towards the longitudinal axis of the body (i.e. the object surface), resilient deformation of part of the retaining means or body is not essential to grip the object. There is also no dependence on the resilient deformation of a member to grip the object initially, since the frictional contact between the object surface and the retaining means is sufficient to entrain the retaining means. The retaining means can also accommodate variations in the width of the object, and is not constrained to be a suitable resiliently deforming member.

The gripping action of the retaining means on the object may be provided by a cam surface located on the inside of the hollow body and arranged to engage the retaining means as it is moved axially towards the opening. The cam surface is arranged to cause the retaining means to move towards the axis of the body, thus the attempted removal of the object entrains the retaining means and causes it to engage the cam surface and thus grip the object.

The release means preferably acts to prevent the retaining means from engaging the cam surface, or moves the retaining means out of engagement with the cam surface, so that the object may easily be removed. To do this, the release means may be arranged such that it may move the retaining means in an axial direction away from the cam surface.

In a preferred embodiment of the present invention, the release means comprises a hollow sleeve for receiving the object which is adapted to fit snugly within the hollow body and to move axially therein, and has one or more holes located around its circumference, preferably at the same axial position. The retaining means comprises one or more gripping means adapted to engage and grip the object, which may be placed in the holes in the sleeve so as to protrude into the hollow body so that they engage the object surface and will not fit past the cam surface when doing so. Preferably, the gripping means and holes are arranged such that the gripping means may move in the holes radially away from or towards the longitudinal axis of the body, but cannot move in an axial direction independently of the sleeve. Thus axial movement of the sleeve into the body entrains the gripping means and will move them out of engagement with the cam surface, releasing the gripping effect. The number of gripping means located around the circumference of the sleeve can be varied. Six has been found to be a suitable number. Since in this embodiment the retaining and release means are physically separate, they may be constructed of different materials and thus adapted to a given desired use.

The use of an axially moveable sleeve carrying freely floating gripping means within the hollow body is a particularly efficient and easy to construct arrangement for both gripping the object and allowing it to be released.

The hollow body preferably comprises a narrower diameter section extending from the opening through which the object is inserted to a given axial depth into the body, followed by an increased diameter section in which the gripping means carried by the sleeve are located when the coupling is assembled. A tapering section is located between the two different diameter sections and acts as the cam surface. In this construction the gripping means are free to move apart away from the longitudinal axis of the body when in the larger diameter section so that the object may be inserted, but upon attempted removal of the object, the friction between the gripping means and object surface causes the gripping means to be moved such that they come into engagement with the cam surface which prevents further axial movement of the gripping means out of the body and forces them inwards to grip the object more tightly, thus preventing its removal. In contrast to attempted removal of the object, insertion of the object will entrain the gripping means away from the cam surface into the larger diameter section if they are not already there, thus allowing the object to be inserted easily.

The cam surface is preferably grooved. This increases its action on the gripping means.

The sleeve preferably extends beyond the opening of the hollow body, such that force may be applied on it to move it into the body in order to hold the gripping means out of contact with the cam surface, therefore allowing removal of the object. The sleeve may also be pushed into the body by a user when inserting the object to move the gripping means away from the cam surface when necessary, instead of simply allowing the friction between the object surface and gripping means to do this, if desired. A flange may be provided on the external part of the sleeve to aid a user in pushing it in a direction into the body. The sleeve may be resiliently biassed in an axial direction out of the opening in the body, such that a positive action is required to release the gripping means and remove the object, thus preventing accidental removal.

The sleeve and gripping means are preferably arranged such that when no object is inserted therein, the gripping means can move sufficiently inwardly towards the longitudinal axis to allow them to pass through the narrower diameter section of the hollow body. This allows the coupling to be simply assembled by inserting the sleeve with the gripping means into the opening through which the object is to be inserted, thereby simplifying the construction of the coupling. A small lug may be provided on the outer surface of the sleeve to retain the sleeve in the body once assembled.

In a particularly preferred embodiment, the gripping means comprise rotatable members such as rollers or balls balls for engaging the surface of the object. These members may have a plurality of teeth on their external surfaces to increase their gripping action. The rotatable members may be supported on the sleeve such that they are free to rotate, with their axes of rotation substantially perpendicular to the longitudinal axis of the hollow body.

The use of rotatable members is especially advantageous because their rotation brings different parts of their surfaces into contact with the object for any given insertion. There is, in effect, therefore a replenishable surface for gripping the object, since should any part of the surface of the rotatable members become too worn, rotation of the member will bring a new part of the surface into contact with the object surface. If teeth or serrations are provided on the rotatable members, then these are effectively continuously replaced as the members rotate. This is contrast to the prior art, for example the device in GB-B-2165604, in which the same surfaces, or teeth, if provided on the insides of the resilient arms, are in contact with the object's surface every time, so that once these surfaces or teeth have become worn, the operation of the device is impaired. Rollers are especially suitable for use in a coupling for hard pipes, such as metal piping, and balls are especially suited to soft deformable pipes.

The present invention therefore also extends to a releasable coupling for retaining an object inserted through an opening in one end of a hollow body, comprising: retaining means for engaging and gripping said object, said retaining means being arranged such that said object may be relatively easily inserted into said body past said retaining means, and such that removal of said object is substantially prevented by the gripping action of said retaining means; and release means for releasing the gripping action of said retaining means to permit withdrawal of said object from said body; wherein said retaining means includes one or more rotatable members adapted to engage the surface of said object, whereby different parts of the member surfaces may be brought into engagement with the surface of said object to assist retention of the object.

An alternative gripping means consists of triangular or rectangular cross-sectioned wedges, which have large flat faces having a large number of teeth thereon in contact with the object surface. These are especially suitable for use with softer objects, such as plastic piping, since there is a greater surface area of teeth in contact with the object at any given time, thereby improving the grip. Another suitable gripping means which can be used with a deformable pipe surface is a ball such as a plastic ball. In use the ball digs into the pipe surface, and the high surface of area of contact between the pipe and ball causes sufficient friction to grip the pipe.

In a preferred arrangement for gripping a deformable pipe, an insert or captive spigot used as a central support core has longitudinal flutes which correspond to the position of gripping balls. The flutes can have circumferential grooves such that when the balls meet the cam surface, they press the pipe into the flutes to be gripped by the grooves.

In the case of a high pressure pipe coupling, a circumferential groove can be included on the pipe to be inserted, such that the gripping means engage therein in use, thus strengthening the gripping effect.

For coupling fragile objects, such as glass tubes, the gripping means are preferably deformable (although, they would not, of course, deform as the object is inserted, due to the design of the coupling of the present invention), for example rubber rollers. When gripping the object, the gripping means in this embodiment will, deform, thus reducing the risk of damage to a fragile object which could occur with substantially rigid gripping means.

A seal, such as an O-ring, may be placed in the larger diameter portion of the hollow body, beyond the end of the sleeve, such that upon insertion of the object into the O-ring (and some resistance may be encountered here), this ring is trapped and thus forms a fluid tight seal between the object and the body. This is especially applicable when coupling pipes. This seal can also have the effect that if there is a back pressure due to fluid flowing in the pipe, then it may be pressed back to act on the sleeve and thus effectively the gripping means, thereby strengthening the grip on the object.

BRIEF DESCRIPTION OF THE DRAWINGS

An embodiment of the invention will now be described by way of example only and with reference to the accompanying drawings, in which:FIG.

DESCRIPTION OF THE DISCLOSED EMBODIMENTS

Figure 1:
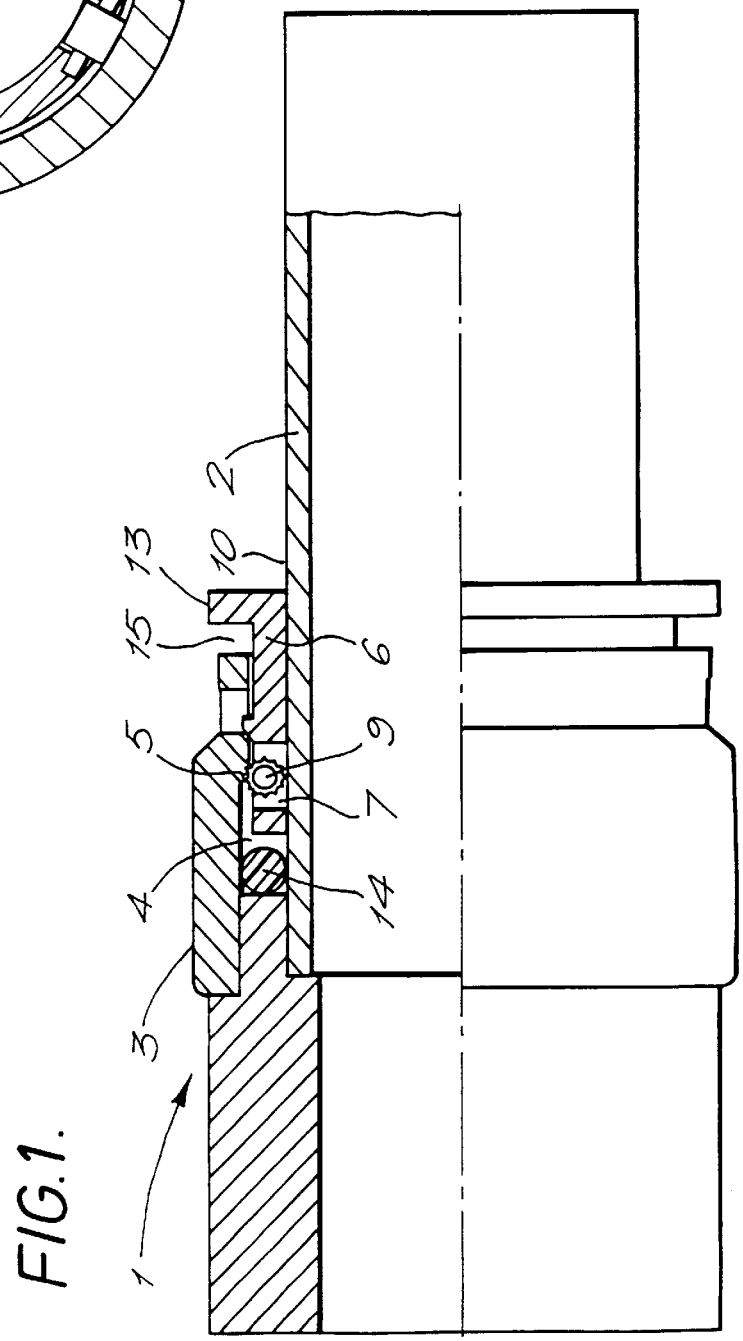
FIG. 1 is a partially cut-away side view of the releasable coupling of the present invention.

In FIG. 1 the releasable coupling is shown generally at 1. A pipe 2 is shown inserted therein such that it is locked in place by the coupling. The coupling 1 comprises a hollow outer body 3 for receiving the pipe 2. In the present embodiment, since the coupling 1 is being used to couple a pipe, it is also shown to have a hollow throughbore section to allow flow of fluid through the pipe and coupling. When the coupling is being used in a plug and socket fashion, which does not require through passage of the fluid, etc., through the coupling, then the end of the hollow body 3 may simply be closed off.

The hollow body 3 has a larger diameter section 4, and an internal reducing taper leading towards the narrow diameter opening on which is provided a grooved cam surface 5 which slopes inwardly towards the axis of the body 3 in a direction towards the opening of the body through which the pipe 2 is inserted. The grooves may be machined or moulded on the cam surface 5.

A sleeve 6 comprising a hollow tube adapted to fit snugly within the hollow body 3 is placed within the body such that at least part of it protrudes beyond the opening in the body 3. The sleeve 6 is able to move in the direction of its longitudinal axis within the body 3.

Located around the circumference at a given axial position on the sleeve 6 are a number of holes 7, and corresponding slots 8, in which gripping means 9 for gripping the pipe 2 are placed. The holes 7 pass completely through the sleeve 6 in a radial direction such that the gripping means 9 are able to come into contact with the pipe surface 10. The slots 8 are closed at the end closest the pipe surface 10 and are adapted to carry the gripping means 9 such that they may move freely and independently of the sleeve 6 at least in a radial direction (i.e.perpendicular to the longitudinal axis of the body, sleeve and pipe), but so that axial movement of the sleeve 6 entrains the gripping means 9 so that they move simultaneously therewith. The holes 7 and slots 8 are located at an axial position on the sleeve 6 such that the gripping means 9 are positioned in the larger diameter section 4 of the hollow body 3 once the coupling is assembled, but so that movement of the sleeve 6 in an axial direction out of the body 3 may bring them into engagement with the cam surface 5.

Figure 3:
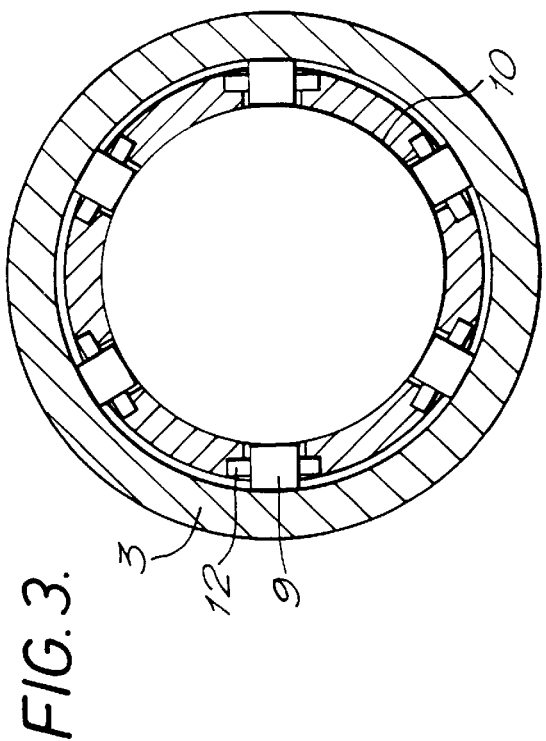
FIG. 3 is a schematic cross-sectional view in a plane perpendicular to the axis of the releasable coupling.

In the present embodiment, the gripping means 9 are shown as rollers, with surfaces 11 which have been milled or otherwise machined to have a number of sharp teeth or grooves thereon. Spindles 12 of the rollers are located in the slots 8 of the sleeve 6, as shown in FIG. 3, such that the rollers are free to rotate and to move in a radial direction within the slots 8. The gripping surfaces 11 of the rollers are located in the holes 7 and can thus come into contact with the surface 10 of the pipe 2. The rollers are dimensioned such that when in contact with the surface of a pipe 10, the gripping surfaces 11 will not pass beyond the cam surface 5.

In an alternative arrangement, the gripping means 9 can be strung on a retaining loop or circlip which passes through their longitudinal axes and encircles the sleeve 6 to retain the gripping means loosely in position. In this arrangement the slots 8 and spindles 12 are unnecessary.

FIG. 3 shows the location of the gripping rollers 9 around the circumference of the sleeve 6. The number of gripping means 9 may, of course, be varied; six has been found to be a suitable number.

The sleeve 6 has an enlarged flange portion 13 on the end thereof which protrudes beyond the opening of the hollow body 3, to allow the user to move the sleeve 6 along the axis of the hollow body 3, and thus the gripping means 9 towards and away from the cam surface 5.

An O-ring 14 may be provided in the larger diameter section 4 of the hollow body 3 beyond the end of the sleeve 6 to act as a seal when the pipe 2 is inserted.

The coupling operates in the following manner. As the pipe 2 is inserted into the sleeve 6 (i.e. the hollow body 3), the gripping means 9 engage its surface 10 and are thus carried inwards, until the gripping means 9 can move radially away from the surface 10 of the pipe such that they open enough to permit free entry of the pipe 2. It is, of course, also possible to press the flange 13 of the sleeve 6 towards the body 3 to move the gripping means inwards so that they may move apart to accommodate the pipe. When an attempt is made to withdraw the pipe through the opening, friction between the gripping means 9 and the surface 10 of the pipe 2 causes the gripping means (and thus the sleeve) to move in an axial direction therewith until they engage the cam surface 5. The action of the cam surface 5 on the gripping means 9 causes them to attempt to move inwards towards the axis of the pipe 2, thereby gripping the pipe more tightly. Thus the more pressure exerted to withdraw the pipe, the greater the grip.

To release the pipe, it is necessary to prevent the axial movement of the gripping means 9 which brings them into contact with cam surface 5 and hence with the pipe as it is removed. This is achieved by pressing the flange 13 of the sleeve 6 in a direction into the hollow body, thus moving the sleeve and hence the gripping means 9 in an axial direction away from the cam surface 5, and positioning the gripping means 9 within the larger section 4 of the hollow body; the pipe 2 may then easily be removed.

Figure 2:
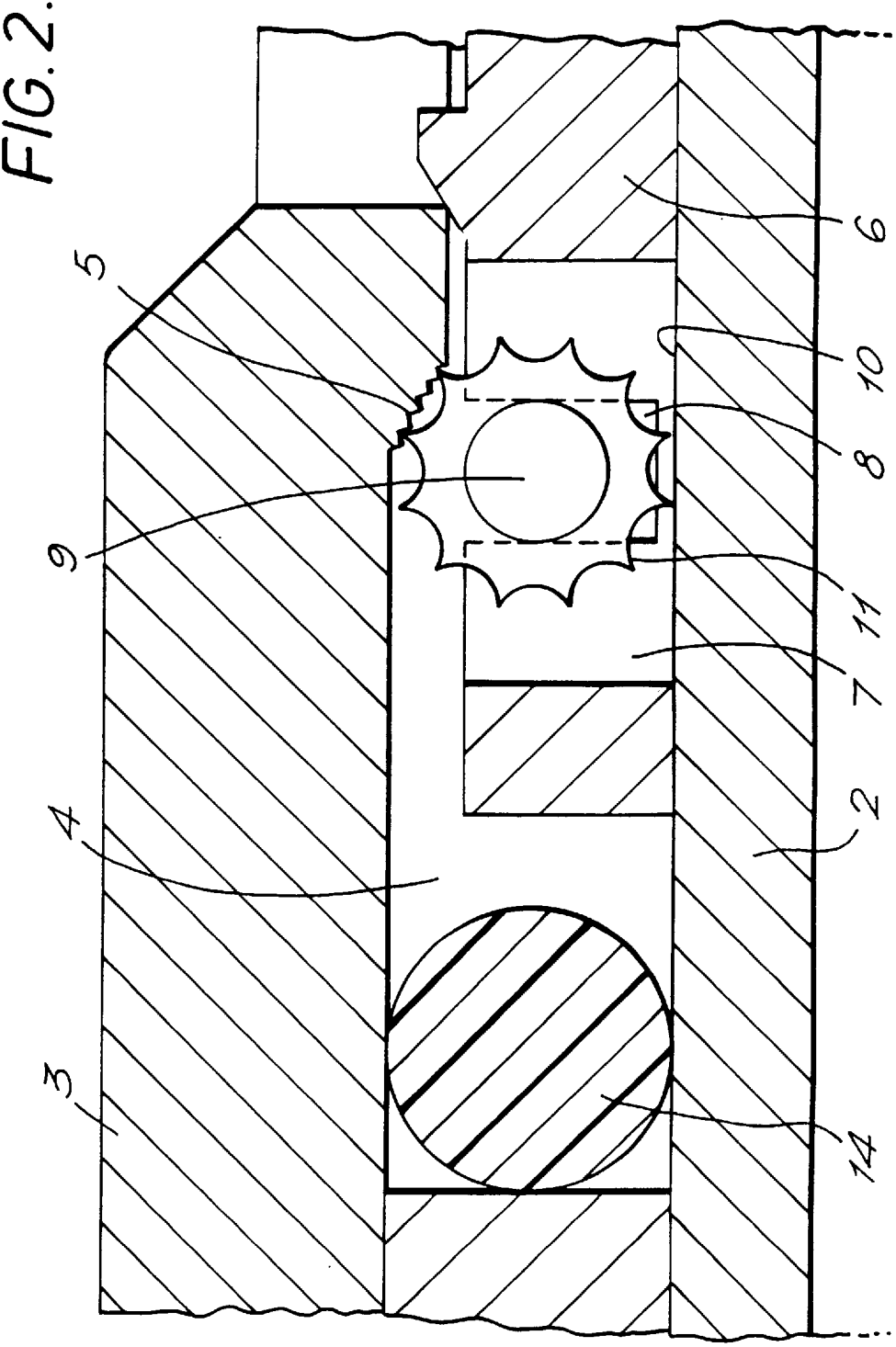
FIG. 2 is an enlarged view of the cut-away portion of FIG. 1 showing the releasable coupling.

When the pipe is inserted, as shown in FIG. 2, the O-ring 14 is trapped between the surface 10 of the pipe and the inner surface of the housing 3, thereby forming a seal. If there is a large back pressure of fluid trying to force the pipe 2 out of the opening of the body 3, the O-ring may be forced against the end of the sleeve 6, thus acting to force the gripping means 9 into stronger contact with the cam surface 5, thereby increasing the gripping effect on the pipe.

A biassing spring 16 may be located in the gap 15 between the end of the hollow body 3 and the flange 13 of the sleeve 6, in order to bias the flange 13 in a direction away from the hollow body 3, thus biassing the gripping means 9 into contact with the cam surface 5. This biassing means may be for example an O-ring, or a spring washer. This biassing of the coupling in a locked position means that the pipe cannot be inadvertently removed, since to do so it is necessary to apply a force on the flange 13 to overcome the biassing of the spring. A positive action is therefore required to release the pipe 2.

Although in the present embodiment the gripping means 9 have been shown as rollers, any other suitable form of gripping means, i.e. one which has a surface to grip the surface of the pipe 10 and a part which will be engaged by the cam surface 5 when a pipe is inserted and attempted to be removed may be used. For example, triangular cross-section wedges having larger lower surfaces with a plurality of teeth thereon, or balls, may be more suitable for softer piping, since a greater surface area in contact with the pipe will increase the gripping action.

Similarly, although the present embodiment describes the use of the coupling of the present invention for coupling pipes, it is in fact suitable for any type of device where it is desired to lock a plug within a socket, with the plug being relatively easily releasable. It could, for example, be used in everyday electrical plugs and sockets to prevent accidental removal of the plug from the socket.

Alternatively, the coupling of the present invention could be used to position and assemble display stands, for example, since it can be placed and held at any desired position on a continuous object passing through it, simply by releasing the coupling, moving it into position and then allowing it to lock again. In a preferred arrangement two couplings could be arranged back-to-back with a bore passing through both couplings, such that the couplings will lock for movement in either direction along an object inserted in the bore, unless one of the couplings is released. In a similar manner, the coupling can be used to control the movement of a continuous object, for example as a ratchet or non-return mechanism, as a brake, or as a clutch. The gripping means could be covered by a friction material for this application.

What is claimed is:

1. A releasable coupling comprising:

a hollow body for receiving an object to be retained, said hollow body having a longitudinal axis and being sized and shaped to receive an object to be retained;

an opening in one end of said hollow body through which an object may be inserted into said body;

retaining means within said hollow body for engaging and gripping the outer surface of the object once it has been inserted, said retaining means being arranged such that the object may be inserted into said body past said retaining means, and such that removal of the object is substantially prevented by the gripping action of said retaining means; and release means for releasing the gripping action of said retaining means to permit withdrawal of the object from said body; wherein said retaining means includes one or more rotatable members adapted to engage the surface of the object, each of said rotatable members having teeth, serrations or grooves which extend completely about the perimeter of an external surface of each rotatable member whereby different parts of each member's external surface may be brought into engagement with the surface of the object when inserted to retain the object in said hollow body.

2. A coupling as claimed in claim 1, wherein the retaining means is arranged such that the object may be inserted into said body substantially without resistance.

3. A coupling as claimed in claim 1, wherein the retaining means is arranged such that attempted removal of the object through the opening causes the retaining means to grip the object more tightly.

4. A coupling as claimed in claim 1, wherein said retaining means are free to move substantially without resistance a distance in a direction substantially perpendicular to the longitudinal axis of the body sufficient to allow the object to be inserted into said body substantially without resistance, contact between the outer surface of an inserted object and said retaining means generating sufficient frictional force during movement of the object in a direction opposite to the direction of insertion to cause said body to entrain said retaining means.

5. A coupling as claimed in claim 1, wherein the gripping action of the retaining means on the object is provided by a cam surface located on the inside of the hollow body and arranged to engage the retaining means as it is moved axially towards the opening.

6. A coupling as claimed in claim 5, wherein the release means acts to prevent the engagement of the cam surface and retaining means, whereby the object may easily be removed.

7. A coupling as claimed in claim 6, wherein the release means is arranged such that it may move the retaining means in an axial direction away from the cam surface.

8. A coupling as claimed in any preceding claim 1, wherein each of the rotatable members are rollers.

9. A releasable coupling comprising:

a hollow body, said hollow body defining an axis and being sized and shaped to receive an object to be retained, the object having an exterior surface;

an opening in one end of said hollow body through which an object to be retained may be axially inserted into said hollow body;

retaining means supported within said hollow body for engaging and gripping the exterior surface of an inserted object, said retaining means being arranged such that the object may be inserted into said body past said retaining means, and such that subsequent removal of the object may be substantially prevented by the gripping action of said retaining means; and release means for releasing the gripping action of said retaining means to permit axial withdrawal of the object from said body; wherein said retaining means includes at least one rotatable member adapted to engage the exterior surface of an object inserted past said rotatable member, said rotatable member having an irregular external gripping surface which may be brought into gripping engagement with the exterior surface of the inserted object to retain the object in said body; and wherein the gripping engagement of the exterior surface of the object by said retaining means results from camming action produced by a grooved cam surface located on the inside of said hollow body, said cam surface being arranged to engage said retaining means in response to axial movement of said rotatable member relative to said cam surface and in the direction of said opening.

10. A coupling as claimed in claim 9, wherein said release means acts to prevent the engagement between said cam surface and said retaining means, whereby an inserted object may easily be removed from said hollow body.

11. A coupling as claimed in claim 10, wherein said release means is arranged such that it may move said retaining means in an axial direction away from said cam surface.

12. A coupling as claimed in claim 9, wherein said retaining means comprises a plurality of said rotatable members, and wherein said rotatable members comprise rollers.

13. A releasable coupling comprising:

a hollow body, said hollow body having a longitudinal axis and being sized and shaped to receive an object to be retained, the object having an exterior surface and a longitudinal axis;

an opening in one end of said hollow body through which an object to be retained may be axially inserted into said hollow body;

retaining means positioned within said hollow body for engaging and gripping the exterior surface of an inserted object, said retaining means being arranged such that the object may be inserted into said body past said retaining means, and such that subsequent removal of the object may be substantially prevented by the gripping action of said retaining means; and release means for releasing the gripping action of said retaining means to permit axial withdrawal of the object from said body; wherein said retaining means comprising a plurality of rotatable members for engaging the surface of an object inserted past said retaining means, each of said rotatable members having an irregular external surface whereby different parts of said irregular external surfaces may be brought into engagement with the exterior surface of an inserted object to thereby retain the object in said hollow body; and wherein the gripping engagement of the exterior surface of an inserted object by said rotatable members results from camming action produced by a cam surface located on the inside of said hollow body, said cam surface being arranged to engage said retaining means in response to axial movement of said rotatable members relative to said cam surface and in the direction of said opening; and wherein:

said release means comprises a hollow sleeve adapted to fit snugly within said hollow body and to move axially therein, said sleeve having a plurality of holes extending therethrough, said holes being located about the circumference of said sleeve, each of said rotatable members of said retaining means being located in a respective of said holes in said sleeve in such a manner that it is free to rotate; said rotatable members and said sleeve being arranged such that said rotatable members protrude into said hollow body for engaging an inserted object, said rotatable members also extending from said sleeve for engagement by said cam surface.

14. A coupling as claimed in claim 13, wherein each of said rotatable members and said sleeve are further arranged such that each rotatable member may move independently radially away from or towards the longitudinal axis of said body, but is entrained for axial movement with said sleeve.

15. A coupling as claimed in claim 13, including six of said rotatable members.

16. A coupling as claimed in claim 13, wherein said hollow body comprises a diameter section extending from said opening through which the object is inserted, said first diameter section being followed by a second diameter section spaced from said opening, the diameter of said second section being greater than the diameter of said first section, said rotatable members being located in said second diameter section when engaged with an inserted object, said cam surface being formed by a tapering section of said hollow body joining said first and second diameter sections.

17. A coupling as claimed in claim 13, wherein said sleeve extends axially beyond said opening of said hollow body.

18. A coupling as claimed in claim 17, wherein the sleeve includes a flange on its external part.

19. A coupling as claimed in claim 13, wherein said sleeve is resiliently biased in an axial direction out of said opening of said body.

20. A coupling as claimed in claim 13, wherein said sleeve and each said rotatable member is arranged such that when no object is inserted in said body each of said rotatable members can move sufficiently inwardly towards the longitudinal axis of said body to allow it to pass out of said body whilst still being located in a said hole in said sleeve.

21. A coupling as claimed in claim 13, wherein said rotatable members are rollers.

22. A coupling as claimed in claim 13, wherein said cam surface is grooved.

23. A coupling as claimed in claim 13, wherein said release means acts to prevent engagement between said cam surface and said retaining means, whereby an inserted object may easily be removed from said hollow body.

24. A coupling as claimed in claim 23, wherein said release means is arranged such that it may move said retaining means in an axial direction away from said cam surface.

* * * * *